United States Patent
Lee et al.

(10) Patent No.: US 10,462,615 B2
(45) Date of Patent: Oct. 29, 2019

(54) METHOD AND SYSTEM FOR TRANSMITTING TEXT MESSAGES

(71) Applicant: NAVER Corporation, Seongnam-si (KR)

(72) Inventors: YungSeong Lee, Seongnam-si (KR);
Dohoon Kim, Seongnam-si (KR);
Jeong Hwa Kim, Seongnam-si (KR);
Hyo Jung Kim, Seongnam-si (KR);
Hak Jin Doh, Seongnam-si (KR); Sun Young Park, Seongnam-si (KR);
Myongwon Seo, Seongnam-si (KR);
Chan Hyuk Sung, Seongnam-si (KR);
Seong Woo Sim, Seongnam-si (KR);
Joseph Yeo, Seongnam-si (KR);
Keonsu Lee, Seongnam-si (KR);
Byoungseung Lee, Seongnam-si (KR);
KyoHee Chang, Seongnam-si (KR);
Hyeonji Jeon, Seongnam-si (KR);
Munhyun Joo, Seongnam-si (KR);
Kidoo Han, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 9 days.

(21) Appl. No.: 15/235,809

(22) Filed: Aug. 12, 2016

(65) Prior Publication Data
US 2017/0055136 A1 Feb. 23, 2017

(30) Foreign Application Priority Data
Aug. 17, 2015 (KR) .................. 10-2015-0115665

(51) Int. Cl.
*H04W 4/12* (2009.01)
*H04M 1/725* (2006.01)
(Continued)

(52) U.S. Cl.
CPC ............ *H04W 4/12* (2013.01); *G06F 16/955* (2019.01); *H04L 51/08* (2013.01);
(Continued)

(58) Field of Classification Search
CPC ......... H04W 4/12; H04W 12/08; H04W 4/21; H04L 67/1097; H04L 67/146; H04L 51/08; H04M 1/72547; G06F 16/955
See application file for complete search history.

(56) References Cited

U.S. PATENT DOCUMENTS

2004/0215696 A1* 10/2004 Fisher .................. G06Q 30/02
709/201
2006/0094454 A1* 5/2006 Kim ....................... H04W 4/12
455/466

(Continued)

FOREIGN PATENT DOCUMENTS

JP 2002-183057 A 6/2002
JP 2004-086731 A 3/2004
(Continued)

OTHER PUBLICATIONS

Office Action issued by the Japanese Patent Office in corresponding Japanese patent application No. 2016-123585, dated Jul. 4, 2017.
(Continued)

*Primary Examiner* — Mazda Sabouri
(74) *Attorney, Agent, or Firm* — Greer, Burns & Crain, Ltd.

(57) ABSTRACT

Provided is a method including providing a text creation interface in response to an execution of a text application; receiving an input signal for selecting content during a text creation process using the text creation interface; uploading the selected content to a cloud storage; and transmitting a text message including route information about a route accessible to the uploaded content to a counter party terminal. If a file capacity of the selected content is greater than or equal to a reference capacity, the selected content is uploaded to the cloud storage in response to a user request and the route information is automatically created and included in the text message.

20 Claims, 12 Drawing Sheets

(51) Int. Cl.
  *H04L 29/08* (2006.01)
  *H04W 12/08* (2009.01)
  *H04W 4/21* (2018.01)
  *H04L 12/58* (2006.01)
  *G06F 16/955* (2019.01)

(52) U.S. Cl.
  CPC .... *H04L 67/1097* (2013.01); *H04M 1/72547* (2013.01); *H04W 4/21* (2018.02); *H04W 12/08* (2013.01)

(56) References Cited

U.S. PATENT DOCUMENTS

| | | | | |
|---|---|---|---|---|
| 2010/0271366 | A1* | 10/2010 | Sung | H04M 1/72555 345/419 |
| 2011/0117883 | A1* | 5/2011 | Drabo | H04W 12/02 455/411 |
| 2013/0260802 | A1* | 10/2013 | Mayblum | H04W 4/14 455/466 |
| 2014/0047027 | A1* | 2/2014 | Moyers | H04L 51/04 709/204 |
| 2014/0053074 | A1* | 2/2014 | Kim | G06F 9/5072 715/738 |
| 2014/0135046 | A1* | 5/2014 | Hewes | H04W 4/12 455/466 |
| 2014/0365555 | A1* | 12/2014 | Jwalanna | H04L 67/42 709/203 |
| 2015/0039761 | A1* | 2/2015 | Patil | H04L 67/10 709/225 |
| 2015/0172238 | A1* | 6/2015 | Ahmed | H04L 51/08 709/217 |
| 2015/0200885 | A1* | 7/2015 | Sharp | H04L 51/08 709/206 |
| 2015/0350134 | A1* | 12/2015 | Yang | H04L 51/063 709/206 |
| 2016/0134571 | A1* | 5/2016 | Lindley | H04L 51/08 709/206 |
| 2016/0308812 | A1* | 10/2016 | Johnstone | H04L 51/22 |

FOREIGN PATENT DOCUMENTS

| | | |
|---|---|---|
| JP | 2005-078278 A | 3/2005 |
| JP | 21006-522415 A | 9/2006 |
| JP | 2013-536637 A | 9/2013 |
| JP | 2014-149813 A | 8/2014 |
| KR | 10-2009-0123717 | 12/2009 |
| KR | 10-2013-0042067 | 4/2013 |
| KR | 10-2014-0005617 | 1/2014 |
| KR | 10-2014-0034339 | 3/2014 |

OTHER PUBLICATIONS

Message transmission adopting an easily comprehensible user interface, iPhone People describing a full of the method for usage and the information on a related application, ASCII Media Works Inc., Sep. 29, 2012; pp. 70-73.

* cited by examiner

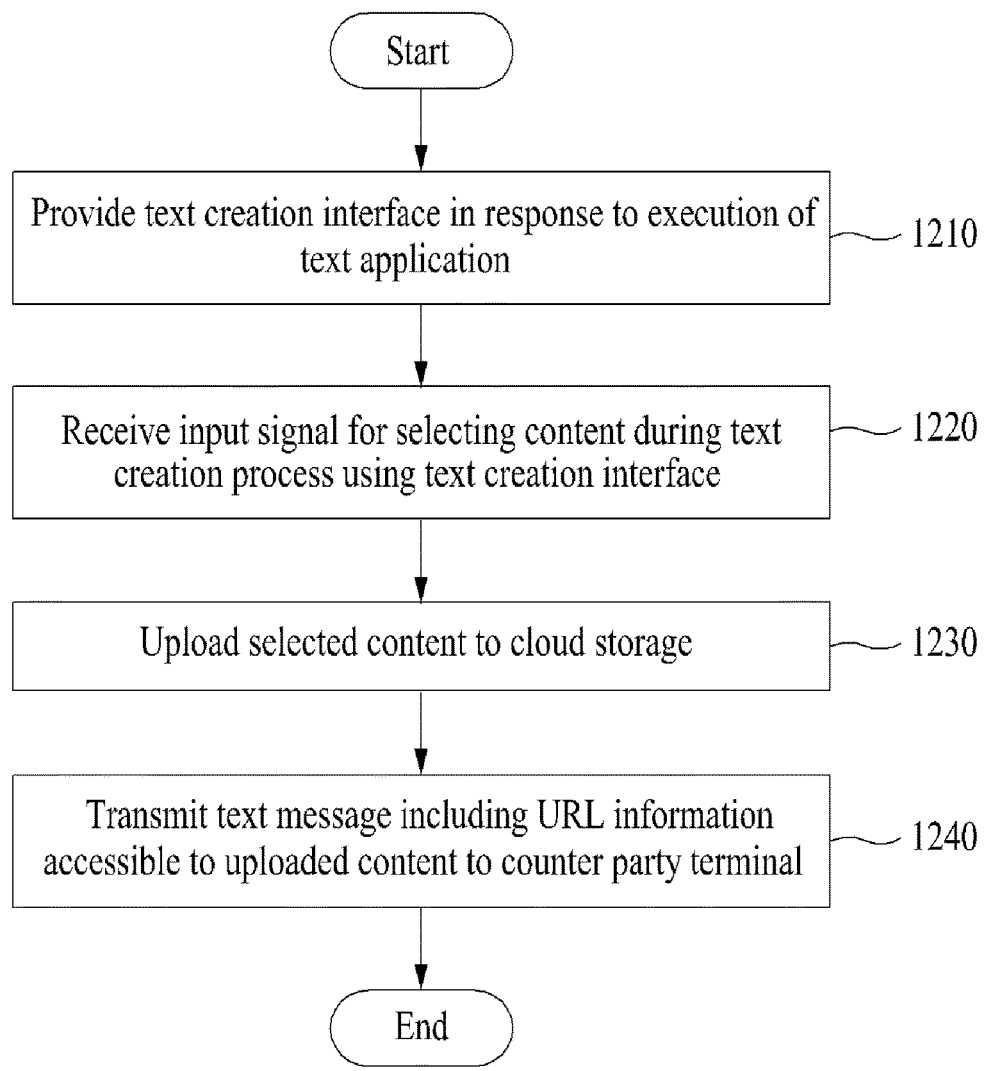

METHOD AND SYSTEM FOR TRANSMITTING TEXT MESSAGES

CROSS-REFERENCE TO RELATED APPLICATION(S)

This application claims priority under 35 U.S.C. § 119 to Korean Patent Application No. 10-2015-0115665 filed on Aug. 17, 2015, in the Korean Intellectual Property Office (KIPO), the entire content of which are incorporated herein by reference.

BACKGROUND

Field

One or more exemplary embodiments of the present invention relate to technology for attaching large content, and more particularly, to a method and system for transmitting a text message by attaching content at a mobile terminal.

Description of Related Art

In general, a portable terminal performs a call function and a function of transmitting and receiving a text message. Here, the text message may include, for example, a short text message including a specific capacity of text data, a long text message including large text data, and a multimedia message including multimedia data, such as photos, music, videos, etc. For example, a user may transmit a short text message having a limited capacity or a long text message including large text data to a counter party. Further, the user may transmit, to the counter party, a multimedia message attached with photo data, sound data, video data, etc., which are acquired using a photographing function, a video recording function, etc., provided from a microphone or a camera mounted to the portable terminal.

Here, to attach data to a text message, a sender generally uploads data to be attached to a cloud storage and then, creates a text, and transmits a multimedia text message to a counter party. Once a recipient receives the multimedia text message, the recipient is required to access a server that provides the attached data in order to verify the multimedia text message. The recipient may download the data and then finally verify the multimedia text data. In related art, there are some constraints on the capacity of an attachment file, for example, 1 MB, a number of attachment files, etc. Thus, if the capacity of the attachment file or the number of attachment files exceeds a threshold value, a user may not attach a file or may need to attach the file as low quality data and then transmit the file.

Korean Patent Publication No. 10-2009-0123717 discloses a portable terminal and method for downloading large data prior to a notification of an incoming text message.

SUMMARY

One or more exemplary embodiments provide a method of transmitting a text message by attaching large content during a text creation process using a text creation interface.

At least one exemplary embodiment provides a method of transmitting a text, the method including providing a text creation interface in response to an execution of a text application; receiving an input signal for selecting content during a text creation process using the text creation interface; uploading the selected content to a cloud storage; and transmitting a text message including route information about a route accessible to the uploaded content to a counter party terminal. If a file capacity of the selected content is greater than or equal to a reference capacity, the selected content is uploaded to the cloud storage in response to a user request and the route information is automatically created and included in the text message.

The content uploaded to the cloud storage may have the same quality as that of original content.

The transmitting of the text message may include creating a content thumbnail by formatting a thumbnail associated with the selected content, and providing the text message based on at least one of uniform resource locator (URL) information and the content thumbnail.

The transmitting of the text message may include connecting to a content viewer page corresponding to the URL information and outputting the content in response to a selection on the URL information or the formatted thumbnail included in the text message at the counter party terminal.

The transmitting of the text message may include outputting the content on the content viewer page based on a standard preset for the uploaded content.

The transmitting of the text message may include providing a download function of downloading the content output on the content viewer page to the counter party terminal, and storing the content on the counter party terminal in response to a selection on the content.

The transmitting of the text message may include deleting the recording of the content uploaded to the cloud storage if the content download period set to the content is met or when the content is downloaded.

The receiving of the input signal may include setting numbers input from a sender or last four numbers of a telephone number of the sender as a password, and the transmitting of the text message may include transmitting the text message including the set password to the counter party terminal so that a recipient authenticates the set password.

The receiving of the input signal may include selecting a recipient to receive the text message from an address book or automatically setting a member included in a created chatroom as the recipient.

The receiving of the input signal may include sorting the selected contents in order in which the contents are selected, and outputting the sorted contents on the text creation interface based on a preset segmentation rate.

At least one exemplary embodiment provides a non-transitory computer-readable medium storing a computer program to implement a method including providing a text creation interface in response to an execution of a text application; receiving an input signal for selecting content during a text creation process using the text creation interface; uploading the selected content to a cloud storage; and transmitting a text message including route information about a route accessible to the uploaded content to a counter party terminal. If a file capacity of the selected content is greater than or equal to a reference capacity, the selected content is uploaded to the cloud storage in response to a user request and the route information is automatically created and included in the text message.

At least one exemplary embodiment provides a system for transmitting a text, the system including an interface processor configured to provide a text creation interface in response to an execution of a text application; a receiver configured to receive an input signal for selecting content during a text creation process using the text creation interface; an uploader configured to upload the selected content to a cloud storage; and a transmitter configured to transmit a text message including route information about a route accessible to the uploaded content to a counter party terminal. If a file capacity of the selected content is greater than or equal to a reference capacity, the selected content is uploaded to the cloud storage in response to a user request and the route information is automatically created and included in the text message.

The content uploaded to the cloud storage may have the same quality as that of original content.

The transmitter may be further configured to create a content thumbnail by formatting a thumbnail associated with the selected content, and to provide the text message based on at least one of uniform resource locator (URL) information and the content thumbnail.

The transmitter may be further configured to connect to a content viewer page corresponding to the URL information and to output the content in response to a selection on the URL information or the formatted thumbnail included in the text message at the counter party terminal.

The transmitter may be further configured to output the content on the content viewer page based on a standard preset for the uploaded content.

The transmitter may be further configured to provide a download function of downloading the content output on the content viewer page to the counter party terminal, and to store the content on the counter party terminal in response to a selection on the content.

The transmitter may be further configured to delete a recording of the content uploaded to the cloud storage if at least one condition of a content download period set to the content and whether the content is downloaded is met.

The receiver may be further configured to set numbers input from a sender or last four numbers of a telephone number of the sender as a password, and the transmitter may be further configured to transmit the text message including the set password to the counter party terminal so that a recipient authenticates the set password.

The receiver may be further configured to select a recipient to receive the text message from an address book or automatically set a member included in a created chatroom as the recipient, and configured to sort the selected contents in order in which the contents are selected, and to output the sorted contents on the text creation interface based on a preset segmentation rate.

According to some exemplary embodiments, it is possible to transmit large and high quality content by transmitting, to a recipient, a text message including URL information that is created by uploading large content to a cloud storage during a text creation process.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Exemplary embodiments will be described in more detail with regard to the figures, wherein like reference numerals refer to like parts throughout the various figures unless otherwise specified, and wherein:

FIG. 12 is a flowchart illustrating a text transmission method performed at a text transmission system according to one exemplary embodiment.

Figure 1:
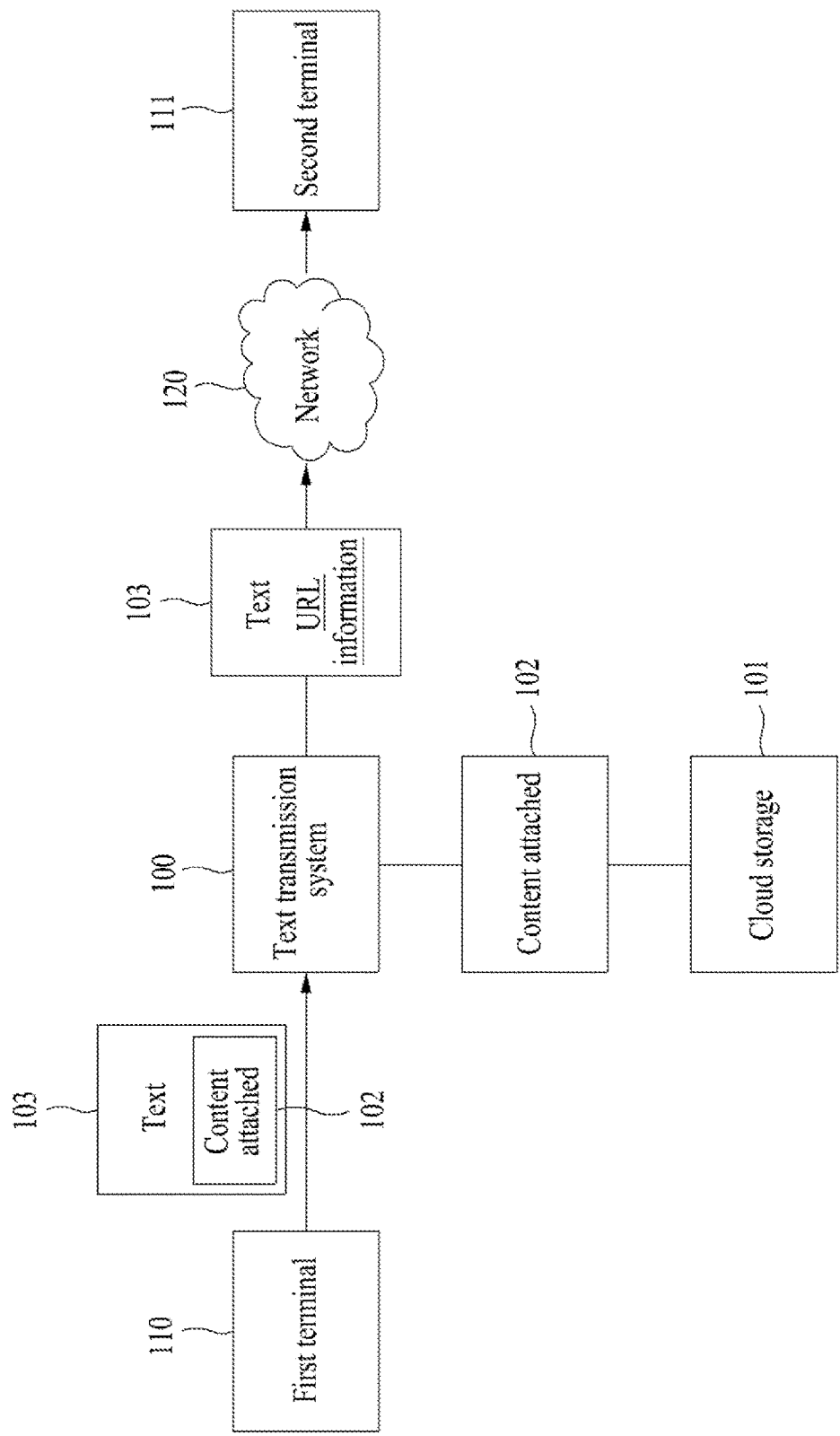
FIG. 1 is a diagram illustrating an operation of a text transmission system according to one exemplary embodiment.

It should be noted that these figures are intended to illustrate the general characteristics of methods and/or structure utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by exemplary embodiments.

DETAILED DESCRIPTION

One or more exemplary embodiments of the present invention will be described in detail with reference to the accompanying drawings. Exemplary embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some exemplary embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an", and "the", are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as at least one of, when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which exemplary embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Exemplary embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more exemplary embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more exemplary embodiments, computer processing devices may be described as including various functional units that perform various operations and/or functions to increase the clarity of the description. However, computer processing devices are not intended to be limited to these functional units. For example, in one or more exemplary embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more exemplary embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the exemplary embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the exemplary embodiments, or they may be known devices that are altered and/or modified for the purposes of exemplary embodiments.

A hardware device, such as a computer processing device, may run an operating system (OS) and one or more software applications that run on the OS. The computer processing device also may access, store, manipulate, process, and create data in response to execution of the software. For simplicity, one or more exemplary embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of exemplary embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, exemplary embodiments will be described with reference to the accompanying drawings.

The term "text application" used herein may indicate an application configured to execute a text function at a user terminal, and may execute other additional functions in addition to the text function. If the text application is installed on a transmission terminal and is not installed on a reception terminal, a text message created by a sender, i.e., a user sending a message, may be transmitted to the reception terminal using a general text transmission method. If the text application is also installed on the reception terminal, a text message may be transmitted through a chatroom created between the transmission terminal and the reception terminal. Also, the text application may serve to upload contents to a cloud storage in conjunction with the cloud storage.

The term "cloud storage" used herein may indicate a storage exclusive for a large attachment as a data storage space on a network for providing a content storage function at a text service.

FIG. 1 is a diagram illustrating an operation of a text transmission system according to one exemplary embodiment.

A text transmission system 100 may attach large content during a text creation process, and may transmit a text message attached with the large content. Also, the text transmission system 100 transmits and receives a text message between user terminals 110 and 111, that is, a first terminal 110 and a second terminal 111 over a network 120. In FIG. 1, it is assumed that the first terminal 110 is a transmission terminal and the second terminal 111 is a reception terminal. If the content is greater than or equal to a reference value based on a preset condition, for example, a file capacity of content, a number of contents, etc., it may be defined as large content.

The user terminal 110,111 may refer to any type of mobile devices capable of connecting to a website/mobile site associated with the text transmission system 100, and installing and executing a service exclusive application, for example, a personal computer (PC), a laptop computer, a smartphone, a tablet, a wearable computer, etc. Here, the user terminal 110, 111 may perform the overall service operation, such as a service screen configuration, a data input, a data transmission and reception, and a data storage, under control of the website/mobile site or the exclusive application.

The network 120 may refer to a medium used to provide communication links between data processing systems, computers, servers, and/or various types of apparatuses. The network 120 may refer to a worldwide collection of networks and gateways using a transmission control protocol/Internet protocol (TCP/IP) suite of protocols for mutual communication between the text transmission system 100 and the user terminal 110, 111. For example, the network 120 may include an intranet, a local area network (LAN), and a wide area network (WAN) or may be a portion thereof. Also, the network 120 may be a part of the Internet.

The first terminal 110 may transmit a text message to the second terminal 111 through the following process. Here, a text application may be installed on the first terminal 110. The text application may be installed on the second terminal 111 or may not be installed on the second terminal 111.

In response to an execution of the text application installed on the first terminal 110, the text transmission system 100 provides a text creation interface to the first terminal 110. A sender of the first terminal 110 may select content 102 to be attached while creating a text 103 to transmit to the second terminal 111 using the text creation interface. The text transmission system 100 may receive an input signal for selecting the content 102 from the sender of the first terminal 110. Here, the content may include an attachment file, for example, a photo, a video, a document file, a schedule, and the like.

The text transmission system 100 may upload, to a cloud storage 101, the content 102 attached at the first terminal 110. In this example, if a file capacity of the selected content is greater than or equal to a reference capacity, the text transmission system 100 may upload the selected content to the cloud storage 101 in response to a user request. Uniform resource locator (URL) information 104 may be automatically created and included in the text message 103.

The text transmission system 100 may store the content 102 attached at the first terminal 110 on the cloud storage 101, and may create URL information accessible to the attached content. The text transmission system 100 may transfer the text message 103 including the URL information to the second terminal 111.

The text transmission system 100 may be configured on a text platform that provides a text service, and may provide a large content transmission environment to the user terminal 110, 111 corresponding to a client using the text service.

The text transmission system 100 may be included in a platform of a text server (not shown) and, without being limited thereto, may be configured as a system separate from the text server to transmit large content using a text message in conjunction with the text server. At least a portion of the constituent elements of the text transmission system 100 may be configured in a form of an application installed on the user terminal 110,111, or may be included in a platform that provides a service in a client-server environment.

Figure 2:
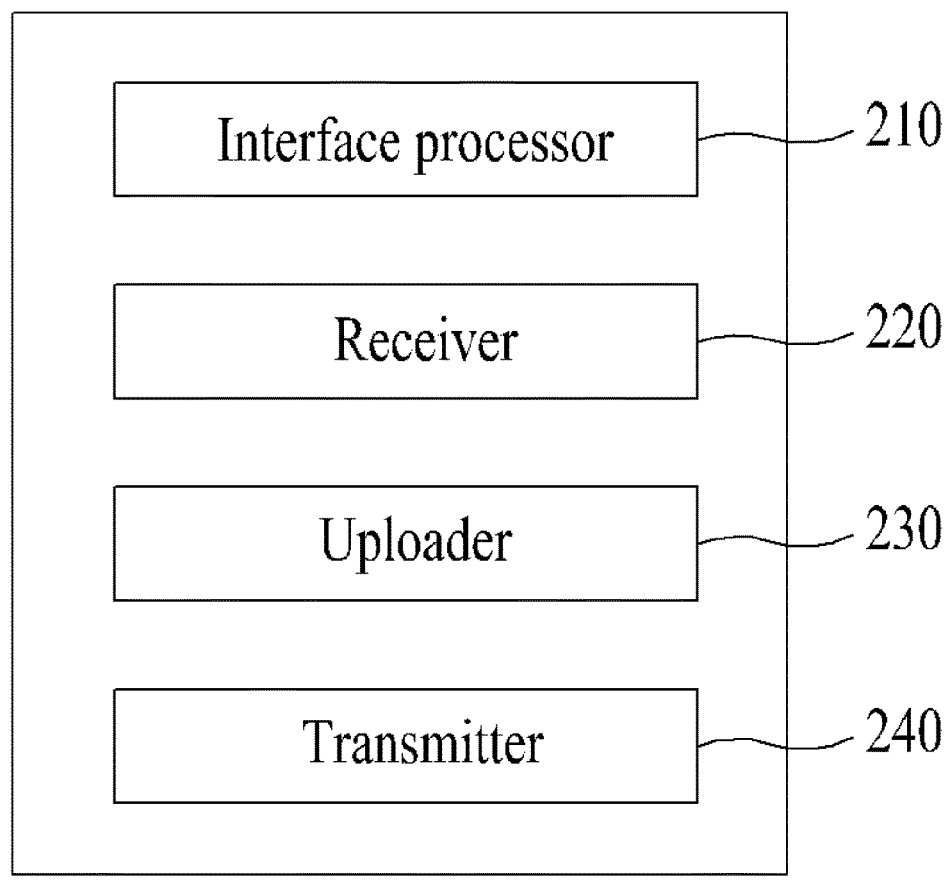
FIG. 2 is a block diagram illustrating a configuration of a text transmission system according to one exemplary embodiment.

FIG. 2 is a block diagram illustrating a configuration of the various units of the text transmission system 100 according to one exemplary embodiment.

Referring to FIG. 2, a text transmission system 100 includes an interface processor 210, a receiver 220, an uploader 230, and a transmitter 240.

The interface processor 210 provides a text creation interface in response to an execution of a text application.

The receiver 220 receives an input signal for selecting content during a text creation process using the text creation interface. The receiver 220 may select a recipient, i.e., a user, to receive the text message from an address book or may automatically set a member included in a created chatroom as the recipient. The receiver 220 may sort the selected contents in order in which the contents are selected, and may output the sorted contents on the text creation interface based on a preset segmentation rate.

The uploader 230 uploads the selected content to a cloud storage.

The transmitter 240 transmits a text message including route information about a route accessible to the uploaded content to a counter party terminal. The transmitter 240 may provide original content to the counter party terminal by transmitting URL information, including location information of the content uploaded to the cloud storage, using the text message.

The transmitter 240 may create a content thumbnail by formatting a thumbnail associated with the selected content, and may provide the text message based on at least one of the URL information and the content thumbnail. In response to a selection on the URL information or the formatted thumbnail included in the text message at the counter party terminal, the transmitter 240 may connect to a content viewer page corresponding to the URL information and may output the content. The transmitter 240 may output the content on the content viewer page based on a standard preset for the uploaded content.

The transmitter 240 may provide a download function of downloading the content output on the content viewer page to the counter party terminal, and may store the content on the counter party terminal in response to a selection on the content. The transmitter 240 may delete a recording of the content uploaded to the cloud storage if the content download period set to the content is met or when the content is downloaded.

FIG. 3 through FIG. 7 illustrate examples of providing a text creation interface and creating a text at a text transmission system 100 according to at least one exemplary embodiment.

Figure 3:
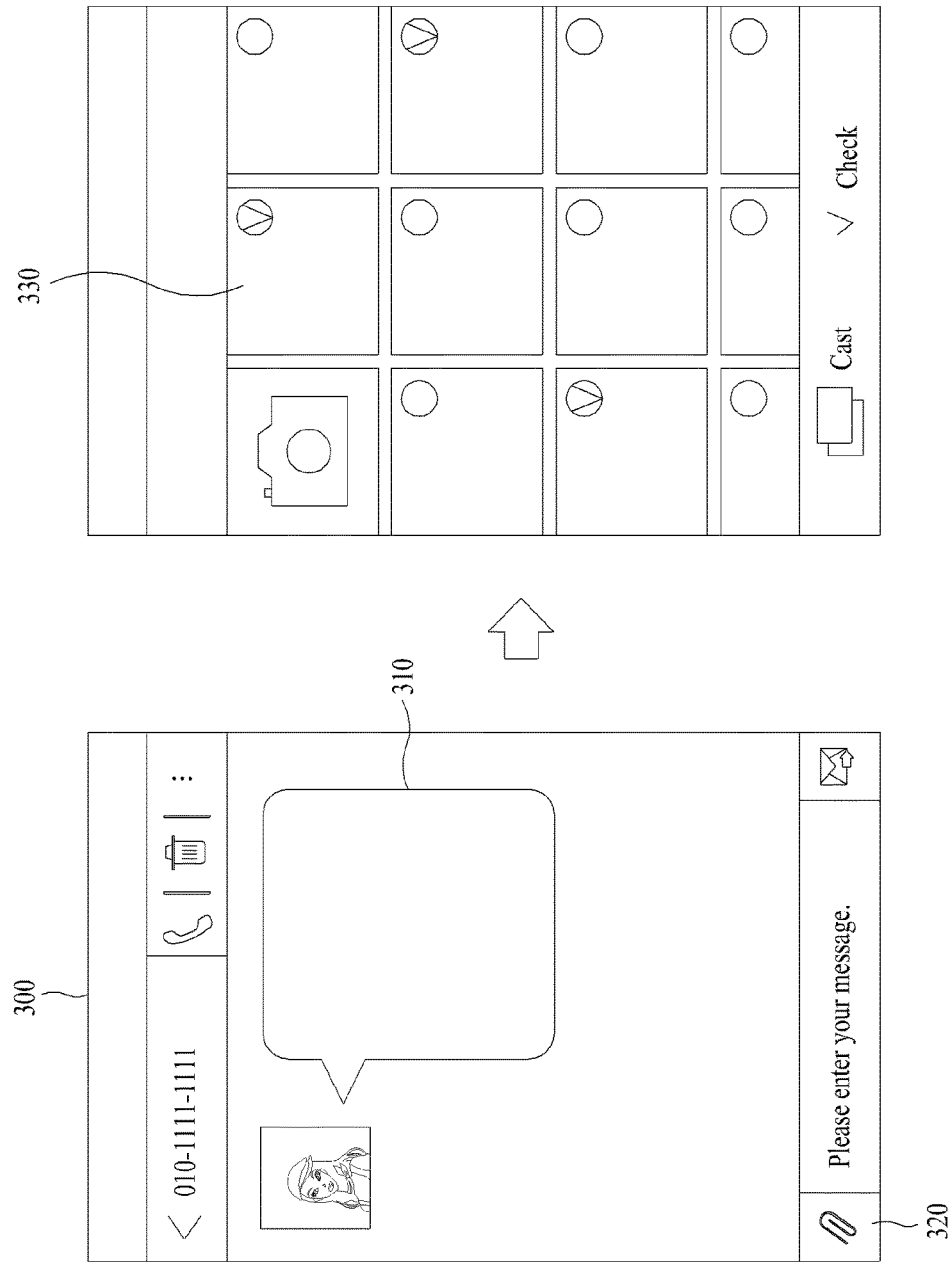
FIG. 3 through FIG. 7 illustrate examples of providing a text creation interface and creating a text at a text transmission system according to at least one exemplary embodiment.

FIG. 3 illustrates an example that describes an operation of a text transmission system 100 according to one exemplary embodiment. A text application 300 may be installed on the first terminal 110 that transmits a text and the text transmission system 100 may provide a text creation interface in response to an execution of the text application. In an example in which a sender is creating a text, the sender may create a text 310 to transmit to a recipient through the text application. Here, the sender may designate the recipient and may select a content attachment interface 320 for transmitting content to the recipient. The content attachment interface 320 may be provided to select contents 330, such as photos, videos, etc, stored in a terminal of the sender. In response to a selection on at least one of the contents 330, the text 310 may be attached with the selected contents.

Also, the sender may set a password. For example, the sender may set a password by directly inputting numbers. Alternatively, last four numbers of a telephone number of the sender may be automatically set as a password. When transmitting a text message by setting a password, the password may be indicated on the text message received at the recipient. The recipient may use the content by authenticating the password. As described above, it is possible to verify content through a URL pattern instead of receiving a text, or to prevent leakage of content through a shortcut URL hacking.

Figure 6:
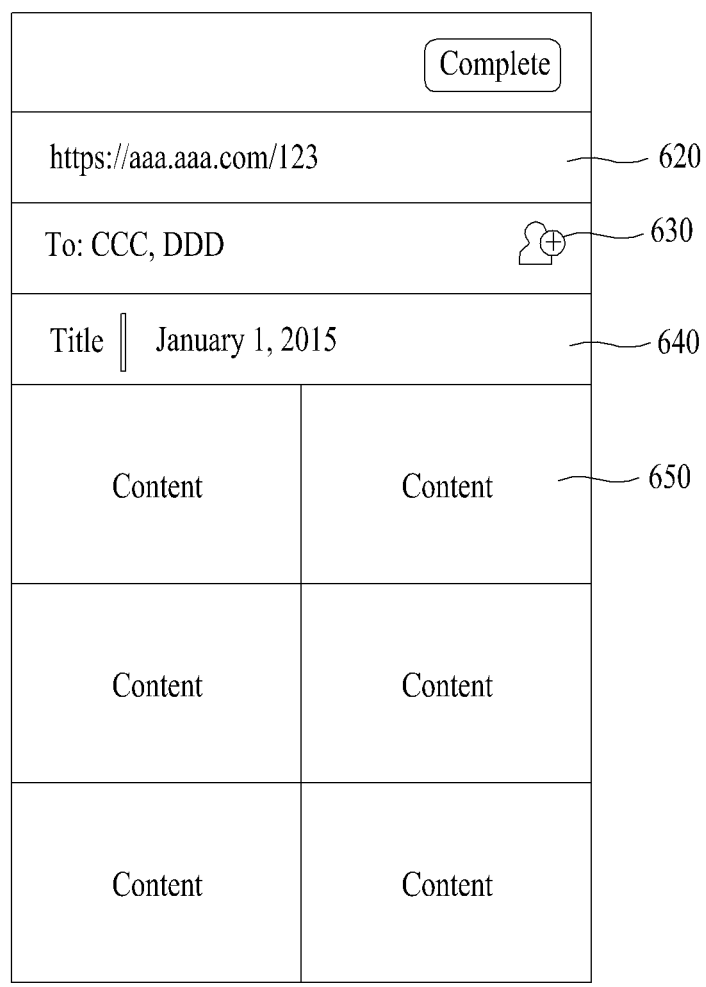
Figure 7:
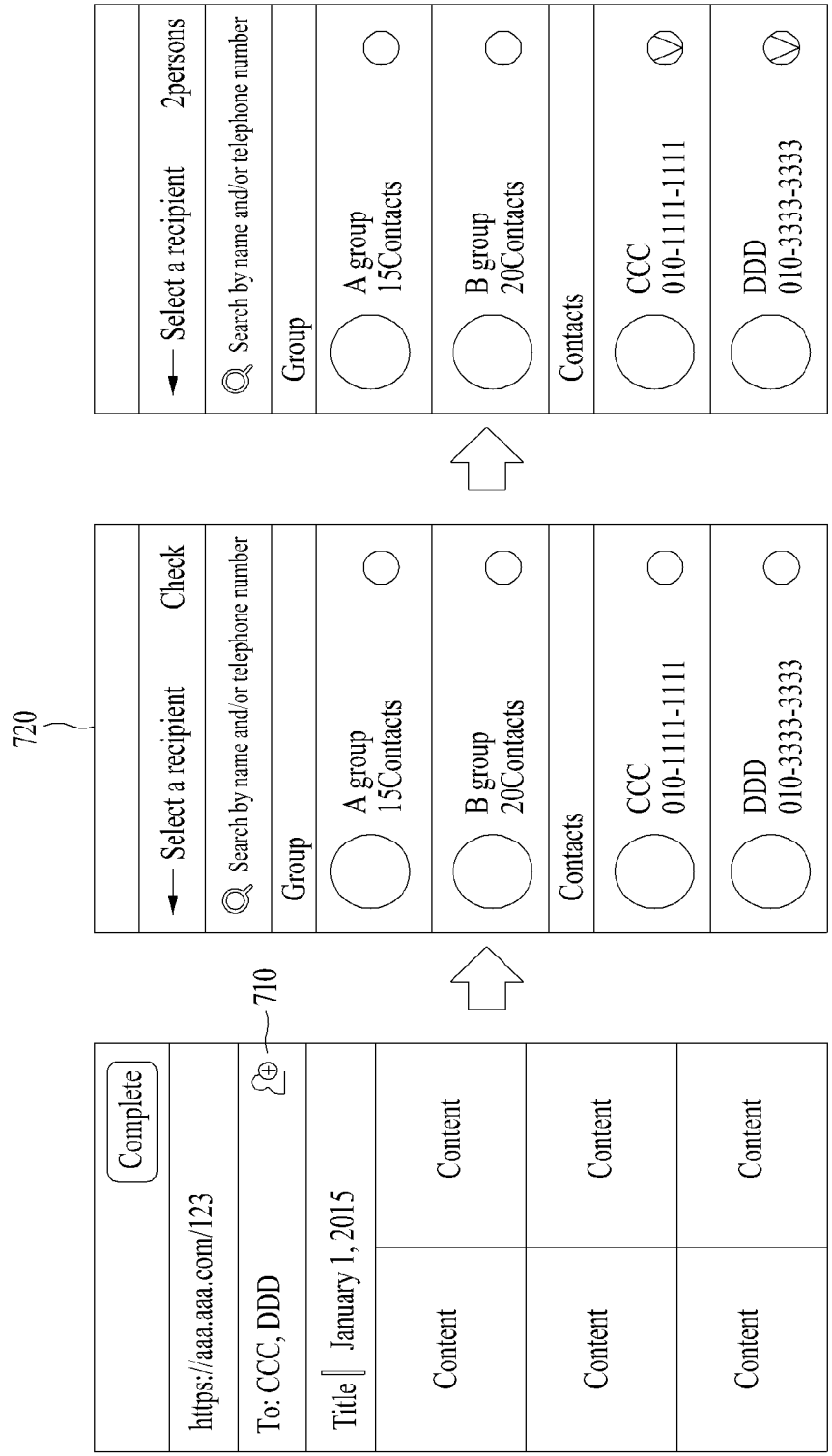

FIG. 6 illustrates an example of a text creation interface provided from a text transmission system 100 according to one exemplary embodiment. Referring to FIG. 6, in response to an execution of a text application, the text transmission system 100 may provide a text creation interface. A sender may select content to transmit to a recipient during a text creation process using the text creation interface. If the sender is creating a new text, the sender may select a recipient prior to selecting content. For example, the sender may select a recipient from an address book stored in a transmission terminal. Referring to FIG. 6 and FIG. 7, the text transmission system 100 may provide a recipient adding interface 630, 710 for adding a recipient to the text creation interface. Once the sender selects the recipient adding interface 630, 710, an address book 720 stored in the transmission terminal of the sender may be output. The address book 720 may be output in a form in which contacts are classified into groups and individuals. An interface for selecting a contact from the address book 720 may be provided. For example, if the sender selects recipients 'CCC' and 'DDD' from the address book 720, it is possible to indicate that two persons are selected. The text transmission system 100 may display the recipients selected by the sender on the text creation interface.

If the text application is also installed on the second terminal 111 of a recipient, a chatroom may be created between the sender and the recipient. Content may be attached through the created chatroom and thus, there is no need to select a separate recipient.

Figure 4:
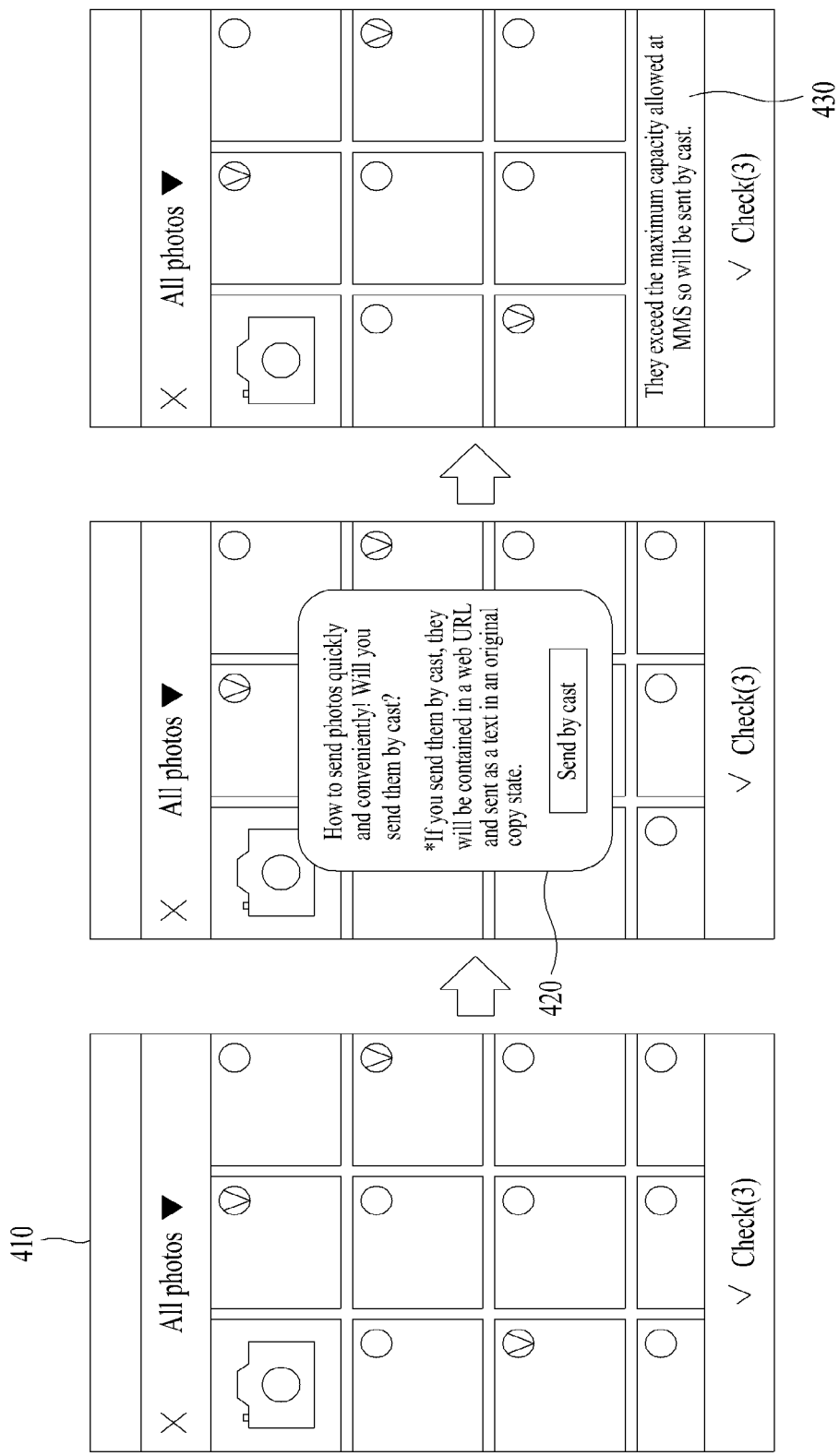

Referring to FIG. 4, once a text application 410 is executed, a sender may select content to be attached during a text creation process. If content selected by the sender meets a preset condition, for example, if a file capacity of the selected content is greater than or equal to a reference capacity, if a number of selected contents is greater than or equal a reference number, etc., the text transmission system 100 may perform an attachment of large content. In this case, a type of a text message to be transmitted may vary based on a capacity of a file attached during a text creation process. A large attachment according to exemplary embodiments may be performed by uploading content to the cloud storage 101 during a text creation process. A large attachment of a text message may be separately performed to transmit a text message including a large file since a multimedia messaging service (MMS) text message exceeds an allowed threshold value. A large attachment according to exemplary embodiments will be referred to as cast.

If the content selected by the sender is greater than or equal to a reference value based on a preset condition, for example, a file capacity of content, a number of contents, etc., the text transmission system 100 may output a message 420 asking whether to perform an attachment of large content. If the sender agrees to perform the large content attachment, the text transmission system 100 may output a speech bubble message 430 indicating performing the attachment of large content.

For example, if the sender selects content to be attached and requests a transmission of a message, the text transmission system 100 may display an alert for verifying a connected communication network and may inform that a text message can be transmitted without data charges.

Figure 5:
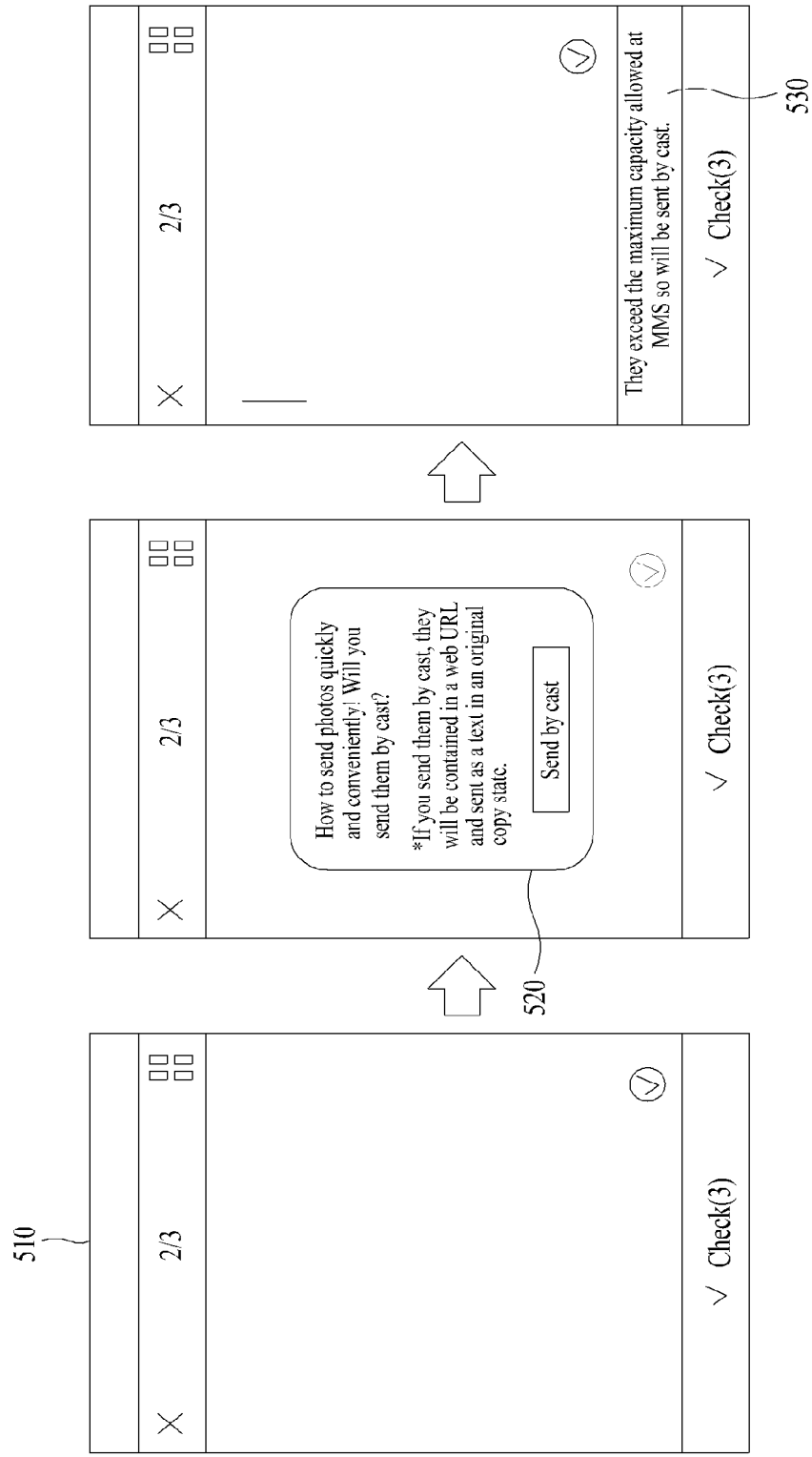

Referring to FIG. 5, the text transmission system 100 may output contents selected by the sender, which is similar to FIG. 4. If the sender selects three contents, the text transmission system 100 may output the contents in order in which the contents are selected. If content selected by the sender is greater than or equal to a reference value based on a preset condition, for example, a file capacity of content, a number of contents, etc., the text transmission system 100 may output a message 520 asking whether to perform an attachment of large content. If the sender agrees to perform the large content attachment, the text transmission system 100 may output a speech bubble message 530 indicating performing the attachment of large content. Further, the large content attachment may be performed by directly selecting content through a storage that stores contents, instead of using the text creation interface.

Here, the text transmission system 100 may upload the selected content to the cloud storage 101 in response to a user request. The user request may include an action of the sender selecting content, for example, a photo, an action of the sender requesting a transmission of a text message, and the like. Also, in response to an action of the sender corresponding to an alert for verifying a communication network, the text transmission system 100 may upload the selected content to the cloud storage 101.

The text transmission system 100 may create location information accessible to the uploaded content, for example, URL information 620 'https://aaa.aaa.com/123' (shown in FIG. 6), and may output the created URL information 620 to the text creation interface. Here, contents 650 selected by the sender may be segmented into two, sorted in selection order, and output to the text creation interface. Also, a title 640 of the selected contents 650 may be set to a default value, for example, today's date, and may be modified.

Figure 8:
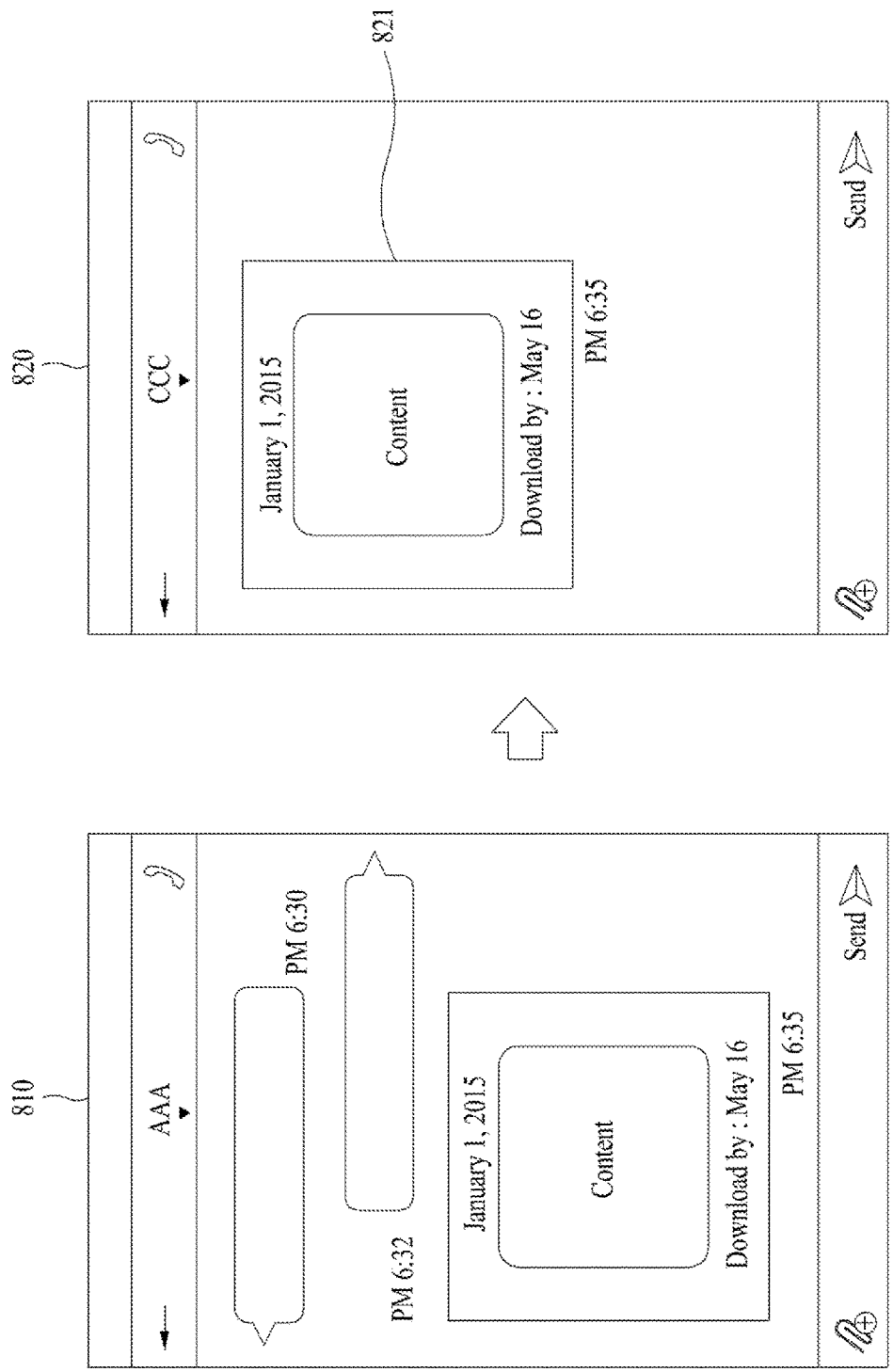
FIGS. 8 and 9 illustrate examples of transmitting a text message that includes uniform resource locator (URL) information at a text transmission system according to at least one exemplary embodiment.
Figure 9:
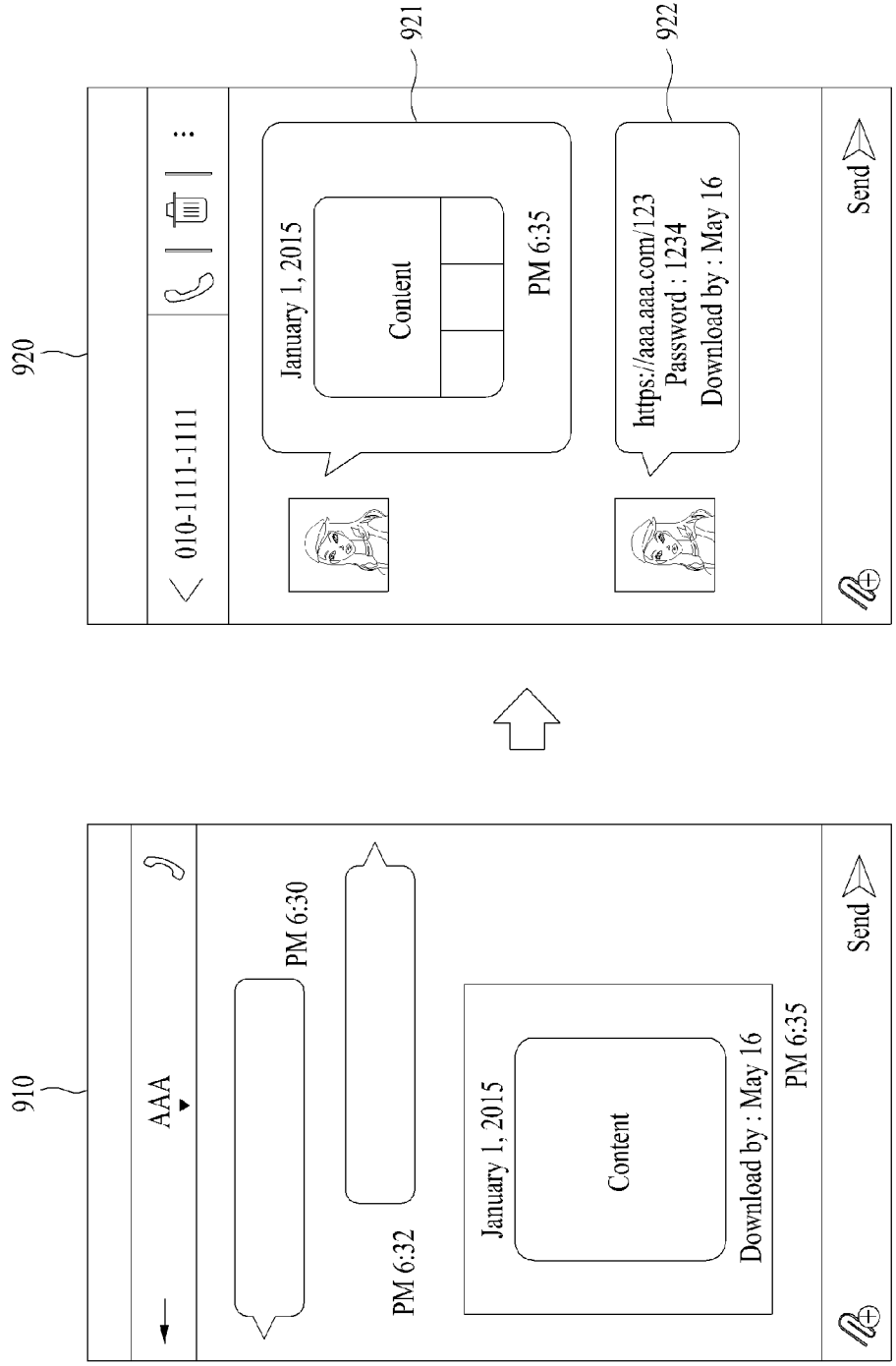

FIGS. 8 and 9 illustrate examples of transmitting a text message that includes URL information at a text transmission system according to at least one exemplary embodiment.

Referring to FIG. 8, if a text application 810 is installed on the second terminal 111 receiving the text, the text transmission system 100 may provide URL information by formatting a thumbnail associated with selected content.

In an example in which 'AAA' transmits a text message to 'CCC', a text application may be installed on each of a terminal of 'AAA' and a terminal of 'CCC'. A text message 821 may be transmitted from the terminal of 'AAA' corresponding to a sender to the terminal of 'CCC' corresponding to a recipient. During a conversation between 'AAA' and 'CCC' through a chatroom 810 of the text application, 'AAA' may attach content. If a file capacity of the content selected by 'AAA' is greater than or equal to a reference capacity, the text transmission system 100 may upload the selected content to the cloud storage 101 in response to a user request and may automatically create URL information accessible to the uploaded content.

The text transmission system 100 may provide URL information by formatting a thumbnail associated with the selected content. For example, the formatted thumbnail may be 'Jan. 1, 2015', and the text transmission system 100 may transmit the text message 821 that includes the formatted thumbnail 'Jan. 1, 2015' to a reception terminal 820. Here, the text message 821 may include the formatted thumbnail and representative content instead of including the URL information accessible to the uploaded content. Also, a content download period in which downloading of content is allowed may be indicated on the text message 821 of the reception terminal 820.

Referring to FIG. 9, if a text application 910 is not installed on a reception terminal 920, the text transmission system may format a thumbnail message associated with selected content and may provide the formatted thumbnail together with URL information.

In an example in which 'AAA' transmits a text message to 'CCC', the text application 910 may be installed on a terminal of 'AAA' and may not be installed in a terminal of 'CCC'. A text message 921 may be transmitted from the terminal of 'AAA' corresponding to a sender to the terminal of 'CCC' corresponding to a recipient. 'AAA' may transmit the text message 921 to 'CCC' by creating a text through the text application 910. 'AAA' may attach content while creating the text to be transmitted to 'CCC'. In this case, if a file capacity of content selected by 'AAA' is greater than or equal to a reference capacity, the text transmission system 100 may upload the selected content to the cloud storage 101 in response to a user request and may automatically create URL information accessible to the uploaded content.

The text transmission system may format a thumbnail associated with the selected content and may provide the formatted thumbnail and the URL information to the reception terminal 920. For example, the formatted thumbnail may be 'Jan. 1, 2015'. The text transmission system may transmit, to the reception terminal 920, the text message 921, 922 that includes the formatted thumbnail 'Jan. 1, 2015' and the URL information. Here, a content download period in which downloading of content is allowed may be indicated on the text message 921, 922 of the reception terminal 920. A password input from a sender or last digit numbers of a telephone number of the sender may be set as a password and indicated on the text message 921, 922 of the reception terminal 920. Here, the password may be set to prevent leakage through shortcut URL hacking.

Figure 10:
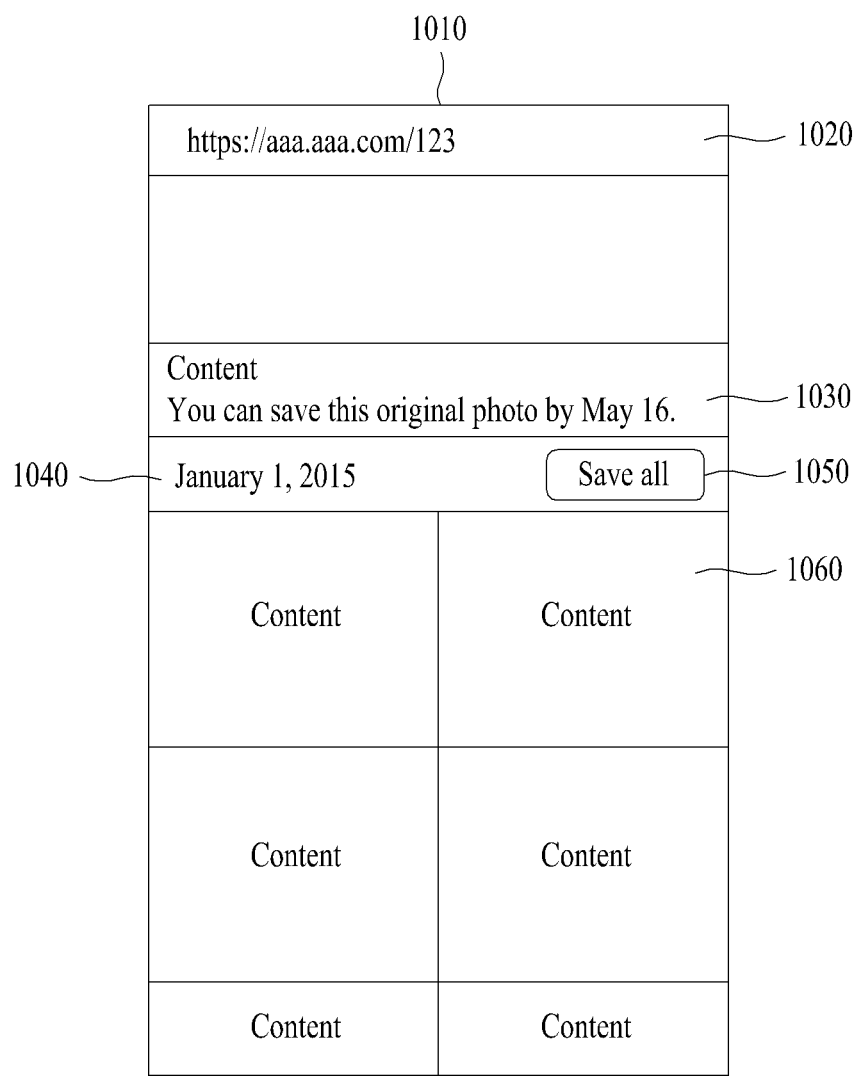
FIGS. 10 and 11 illustrate examples of connecting to a content viewer page in response to a selection on a text message that includes URL information at a text transmission system according to at least one exemplary embodiment.
Figure 11:
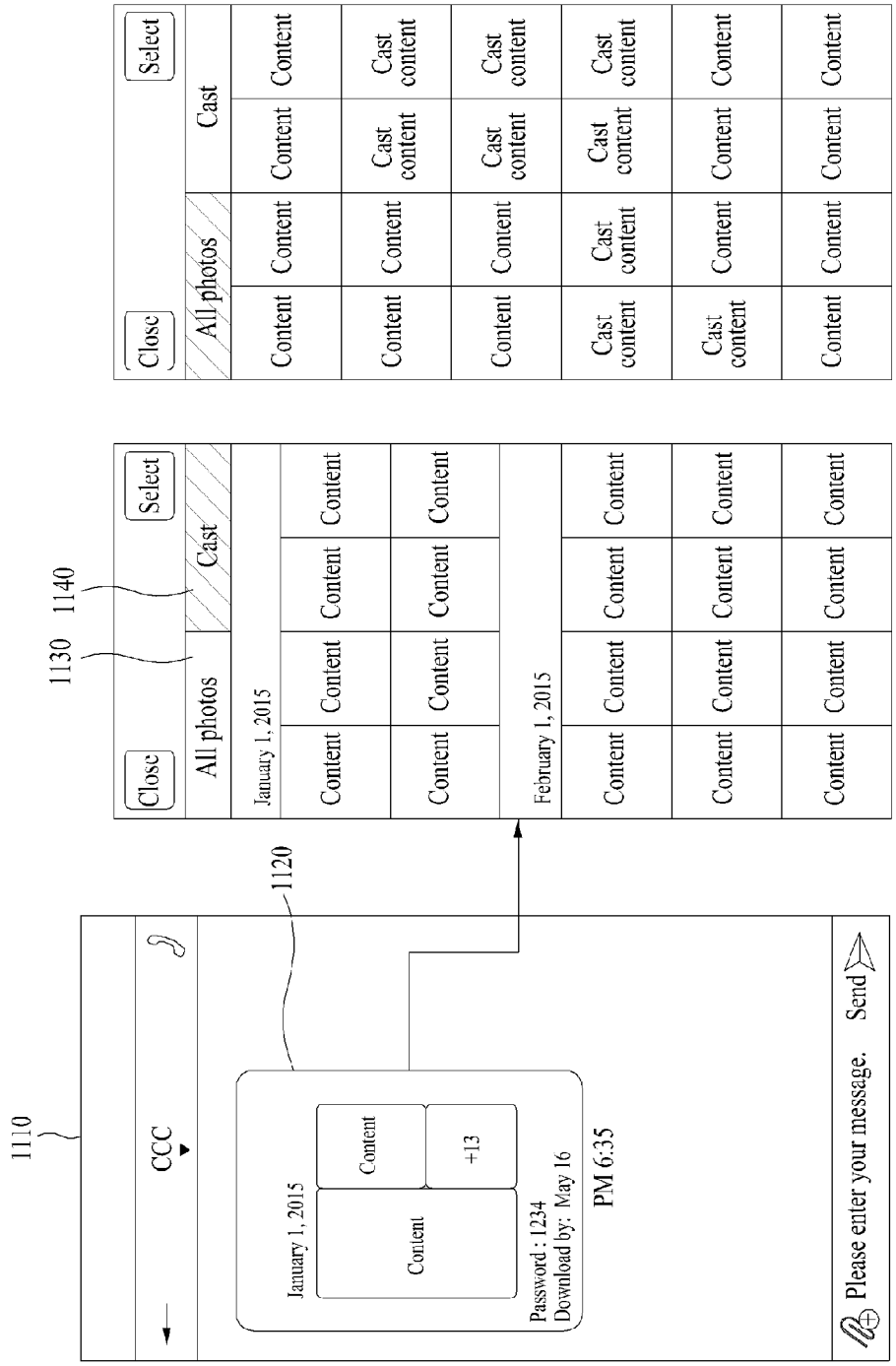

FIGS. 10 and 11 illustrate examples of connecting to a content viewer page in response to a selection on a text message that includes URL information at a text transmission system 100 according to at least one exemplary embodiment.

The text transmission system 100 may transmit, to the second terminal 111, a text message that includes URL information. A recipient may receive the text message that includes the URL information, or may select the text message that includes the URL information. Here, the received text message may include the URL information or a formatted thumbnail. Referring to FIG. 10, once the recipient selects URL information or a formatted thumbnail included in a text message, the text transmission system 100 may connect to a content viewer page 1010 corresponding to the URL information, and may output, i.e., display, content. For example, the text transmission system 100 may connect to the content viewer page 1010 corresponding to URL information 'https://aaa.aaa.com/123'.

URL information 1020, a content download period 1030, a thumbnail 1040, a save all interface 1050, and uploaded contents 1060 may be displayed on the content viewer page 1010. For example, the URL information 1020 may be displayed as 'https://aaa.aaa.com/123', the content download period 1030 may be displayed as 'possible to save the original photo by May 16', the thumbnail 1040 may be displayed as 'Jan. 1, 2015', and the uploaded contents 1060 may be segmented into two and thereby output in order in which the contents are selected by the sender.

If the recipient desires to download all of the attached contents transmitted from the sender, the recipient may store, i.e., save all of the contents in the second terminal 111 through the save all interface 1050. Alternatively, the recipient may select content desired to download from among the attached contents and may store the selected content. Here, content displayed on the content viewer page 1010 may be automatically downloaded and may also be downloaded through wireless fidelity (Wi-Fi).

If a text application is installed on both the first (transmission) terminal 110 and the second (reception) terminal 111, images of contents may be parsed and output on the second terminal 111 through a chatroom between the sender and the recipient.

Referring to FIG. 11, if a recipient selects URL information or a formatted thumbnail included in a text message 1120, the text transmission system 100 may connect to a content viewer page corresponding to the URL information and may output content. Here, the text message 1120 received at a reception terminal 1110 may include representative content and the formatted thumbnail accessible to the uploaded content. Also, a content download period in which downloading of content is allowed may be indicated on the text message 1120 of the reception terminal 1110. For example, a thumbnail 'Jan. 1, 2015', contents +13, etc., may be indicated on the text message 1120. If a password is set by a sender, 'password: 1234' may be output on the text message 1120 of the reception terminal 1110. The recipient may use the content by performing authentication based on the password indicated on the text message 1120.

In response to a selection on the text message 1120, the recipient may connect to a content viewer page. Content for each preset reference may be displayed on the content viewer page. For example, contents may be classified based on an uploaded date and thereby output on the content viewer page, and content including a large attachment may be separately classified and thereby output on the content viewer page. In detail, contents attached to a received text, for example, content attached to an MMS text and content received through a large attachment, may be output at the reception terminal 1110 through a category 'all photos' 1130. The content received through the large attachment may be separately classified and thereby output through a category 'cast' 1140.

FIG. 12 is a flowchart illustrating a text transmission method performed at a text transmission system 100 according to one exemplary embodiment.

In operation 1210, the interface processor 210 provides a text creation interface in response to an execution of a text application.

In operation 1220, the receiver 220 receives an input signal for selecting content during a text creation process using the text creation interface.

In operation 1230, the uploader 230 uploads the selected content to the cloud storage 101. For example, the uploader 230 may upload the selected content to the cloud storage in response to a user request, based on a preset condition, such as a file capacity of the selected content, a number of files included in the selected content, and the like. For example, if a file capacity of content selected by a sender is less than or equal to a reference capacity, an MMS text may be available. However, instead of using the MMS text, the uploader 230 may upload the selected content to the cloud storage 101 by attaching the content to the text message 103.

In operation 1240, the transmitter 240 transmits a text message including URL information accessible to the uploaded content to a counter party terminal. The transmitter 240 may transmit URL information including location information of the content uploaded to the cloud storage 101 using the text message, so that the counter party terminal may use original content.

According to exemplary embodiments, the text transmission system 100 may transmit a text message that includes URL information by uploading large content to the cloud storage 101 and thus, may transmit large content without additional charges.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular exemplary embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of transmitting a text message from a first terminal to a second terminal, the method comprising:
    providing a text creation interface in response to an execution of a text application at the first terminal;
    providing a content attachment interface for selecting content to be attached to the text message being created using the text creation interface;
    receiving, from the first terminal, an input signal for selecting the content using the content attachment interface during a text creation process using the text creation interface;
    when a file capacity of the selected content is greater than or equal to a reference capacity, the reference capacity being a maximum capacity allowed for Multimedia Messaging Service (MMS) text message:
    uploading the selected content from the first terminal to a cloud storage in response to a user request to send the selected content as route information about a route accessible to the uploaded content to the second terminal; and
    transmitting a text message including the route information to the second terminal; and
    when the file capacity of the selected content is less than the reference capacity, transmitting the text message as an MMS text message including the selected content attached thereto;
    wherein the uploading comprises:
    displaying, in response to the file capacity of the selected content being greater than or equal to the reference capacity based on the file capacity of the selected content, a message asking whether to execute a large content attachment function for uploading the selected content; and
    displaying, in response to the execution of the large content attachment function being requested, an alert for verifying a communication network to which the first terminal is connected.

2. The method of claim 1, wherein the content uploaded to the cloud storage has the same quality as that of the selected content.

3. The method of claim 1, wherein the transmitting of the text message comprises creating a content thumbnail by formatting a thumbnail associated with the selected content, and providing the text message based on at least one of uniform resource locator (URL) information associated with the selected content and the content thumbnail.

4. The method of claim 3, wherein the transmitting of the text message comprises connecting to a content viewer page corresponding to the URL information and outputting the uploaded content on the content viewer page in response to a selection on the URL information or the formatted thumbnail included in the text message at the second terminal.

5. The method of claim 4, wherein the transmitting of the text message comprises outputting the content on the content viewer page based on an uploaded date or a category of the uploaded content.

6. The method of claim 4, wherein the transmitting of the text message comprises providing a download function of downloading the content output on the content viewer page to the second terminal, and storing the output content on the second terminal in response to a selection on the output content.

7. The method of claim 6, wherein the transmitting of the text message comprises deleting a recording of the content uploaded to the cloud storage if a content download period set to the uploaded content is met or when the uploaded content is downloaded.

8. The method of claim 1, wherein the receiving of the input signal comprises setting numbers input from a sender of the text message or last four numbers of a telephone number of the sender as a password, and
    the transmitting of the text message comprises transmitting the text message including the set password to the second terminal so that a recipient of the text message authenticates the set password.

9. The method of claim 1, wherein the receiving of the input signal comprises selecting a recipient to receive the text message from an address book or automatically setting a member included in a created chatroom as the recipient.

10. The method of claim 9, wherein the receiving of the input signal comprises sorting the selected content in order in which each piece of the content is selected, and outputting the sorted content on the text creation interface.

11. A non-transitory computer-readable medium storing a computer program to implement a method of transmitting a text message from a first terminal to a second terminal, said method comprising:
    providing a text creation interface in response to an execution of a text application at the first terminal;
    providing a content attachment interface for selecting content to be attached to the text message being created using the text creation interface;
    receiving, from the first terminal, an input signal for selecting the content using the content attachment interface during a text creation process using the text creation interface;
    when a file capacity of the selected content is greater than or equal to a reference capacity, the reference capacity being a maximum capacity allowed for Multimedia Messaging Service (MMS) text message:
        uploading the selected content from the first terminal to a cloud storage in response to a user request to send the selected content as route information about a route accessible to the uploaded content to the second terminal; and
        transmitting a text message including the route information to the second terminal; and
    when the file capacity of the selected content is less than the reference capacity, transmitting the text message as an MMS text message including the selected content attached thereto;

wherein the uploading comprises:
    displaying, in response to the file capacity of the selected content being greater than or equal to the reference capacity based on the file capacity of the selected content, a message asking whether to execute a large content attachment function for uploading the selected content; and
    displaying, in response to the execution of the large content attachment function being requested, an alert for verifying a communication network to which the first terminal is connected.

12. A system for transmitting a text message from a first terminal to a second terminal, the system comprising:
    an interface processor configured to provide a text creation interface in response to an execution of a text application at the first terminal and providing a content attachment interface for selecting content to be attached to the text message being created using the text creation interface;
    a receiver configured to receive, from the first terminal, an input signal for selecting the content using the content attachment interface during a text creation process using the text creation interface;
    an uploader configured to, when a file capacity of the selected content is greater than or equal to a reference capacity, the reference capacity being a maximum capacity allowed for Multimedia Messaging Service (MMS) text message, upload the selected content from the first terminal to a cloud storage in response to a user request to send the selected content as route information about a route accessible to the uploaded content to the second terminal; and
    a transmitter configured to, when the file capacity of the selected content is greater than or equal to the reference capacity, transmit a text message including the route information to the second terminal, and when the file capacity of the selected content is less than the reference capacity, transmit the text message as an MMS text message including the selected content attached thereto;
    wherein the uploading comprises:
        displaying, in response to the file capacity of the selected content being greater than or equal to the reference capacity based on the file capacity of the selected content, a message asking whether to execute a large content attachment function for uploading the selected content; and
        displaying, in response to the execution of the large content attachment function being requested, an alert for verifying a communication network to which the first terminal is connected.

13. The system of claim 12, wherein the content uploaded to the cloud storage has the same quality as that of the selected content.

14. The system of claim 12, wherein the transmitter is further configured to create a content thumbnail by formatting a thumbnail associated with the selected content, and to provide the text message based on at least one of uniform resource locator (URL) information associated with the selected content and the content thumbnail.

15. The system of claim 14, wherein the transmitter is further configured to connect to a content viewer page corresponding to the URL information and to output the uploaded content on the content viewer page in response to a selection on the URL information or the formatted thumbnail included in the text message at the second terminal.

16. The system of claim 15, wherein the transmitter is further configured to output the content on the content viewer page based on an uploaded date or a category of the uploaded content; and
    wherein the output content on the content viewer page further includes content attached to an MMS text message.

17. The system of claim 14, wherein the transmitter is further configured to provide a download function of downloading the content output on the content viewer page to the second terminal, and to store the output content on the second terminal in response to a selection on the output content.

18. The system of claim 17, wherein the transmitter is further configured to delete a recording of the content uploaded to the cloud storage if a content download period set to the uploaded content is met or when the uploaded content is downloaded.

19. The system of claim 12, wherein the receiver is further configured to set numbers input from a sender of the text message or last four numbers of a telephone number of the sender as a password, and
    the transmitter is further configured to transmit the text message including the set password to the second terminal so that a recipient of the text message authenticates the set password.

20. The system of claim 12, wherein the receiver is further configured to select a recipient to receive the text message from an address book or automatically set a member included in a created chatroom as the recipient, and configured to sort the selected content in order in which each piece of the content is selected, and to output the sorted content on the text creation interface.

* * * * *